United States Patent [19]
Chang et al.

[11] Patent Number: 5,923,167
[45] Date of Patent: Jul. 13, 1999

[54] PULSED NUCLEAR MAGNETISM TOOL FOR FORMATION EVALUATION WHILE DRILLING

[75] Inventors: Shu-Kong Chang; Krishnamurthy Ganesan; Martin Erich Poitzsch, all of Sugar Land, Tex.; Robert Kleinberg, Ridgefield, Conn.; Abdurrahman Sezginer, Houston, Tex.

[73] Assignee: Schlumberger Technology Corporation, Ridgefield, Conn.

[21] Appl. No.: 08/819,463

[22] Filed: Mar. 17, 1997

Related U.S. Application Data

[60] Continuation-in-part of application No. 08/727,814, Oct. 8, 1996, which is a division of application No. 08/338,317, Nov. 14, 1994, Pat. No. 5,629,623, which is a continuation-in-part of application No. 08/200,815, Feb. 22, 1994, abandoned, which is a continuation of application No. 07/922,254, Jul. 30, 1992, abandoned.

[51] Int. Cl.$^6$ .................................................... G01V 3/00
[52] U.S. Cl. ................................................................ 324/303
[58] Field of Search ............................. 324/303, 300, 324/306, 307, 309

[56] References Cited

U.S. PATENT DOCUMENTS

| | | |
|---|---|---|
| 1,158,959 | 11/1915 | Beach . |
| 3,205,477 | 9/1965 | Kalbfell ................................. 340/18 |
| 3,360,716 | 12/1967 | Bloom et al. ........................ 324/300 |
| 3,395,337 | 7/1968 | Varian ................................. 324/300 |
| 3,402,344 | 9/1968 | Brown et al. ........................ 324/303 |
| 3,617,867 | 11/1971 | Herzog ................................. 324/303 |
| 3,667,035 | 5/1972 | Slichter ............................... 324/303 |
| 3,777,560 | 12/1973 | Guignard ............................. 73/151.5 |
| 3,784,898 | 1/1974 | Darley et al. ........................ 324/303 |
| 4,350,955 | 9/1982 | Jackson et al. ...................... 324/303 |
| 4,479,564 | 10/1984 | Tanguy ................................. 367/35 |
| 4,536,714 | 8/1985 | Clark ................................... 324/338 |
| 4,629,986 | 12/1986 | Clow et al. ......................... 324/303 |
| 4,656,422 | 4/1987 | Vail, III et al. ..................... 324/303 |
| 4,710,713 | 12/1987 | Strikman ............................. 324/303 |
| 4,714,881 | 12/1987 | Givens ................................. 324/303 |
| 4,717,876 | 1/1988 | Masi et al. .......................... 324/303 |
| 4,717,877 | 1/1988 | Taicher et al. ...................... 324/303 |
| 4,717,878 | 1/1988 | Taicher et al. ...................... 324/303 |
| 4,785,245 | 11/1988 | Lew et al. ........................... 324/308 |
| 4,792,757 | 12/1988 | Vail, III et al. ..................... 324/303 |
| 4,825,163 | 4/1989 | Yabusaki et al. ................... 324/318 |
| 4,829,252 | 5/1989 | Kaufman ............................ 324/309 |

(List continued on next page.)

FOREIGN PATENT DOCUMENTS

| | | |
|---|---|---|
| 0 295 134 | 12/1988 | European Pat. Off. . |
| 2 056 082 | 3/1981 | United Kingdom . |
| 92/10768 | 6/1992 | WIPO . |

OTHER PUBLICATIONS

Timur, A.; "Pulsed Nuclear Magnetic Resonance Studies of Porosity, Movable Fluid, and Permeability of Sand Stones", SPE–AIME, 1969, J. of Petroleum Technologies.

Miller, M., et al; "Spin Echo Magnetic Resonance Logging: Porosity and Free Fluid Index Determination", SPE 202561.

Herrick, R., et al; "An Improved Nuclear Magnetic Logging Sustem and its Application to Formation Evaluation", SPE 8361.

Jackson, J., et al; "Remote (Inside–Out) NMR 111. Detection of NMR in a Remotely Distanced Region of Homogenous Magnetic Field", Academic Press Mag., 1980.

*Primary Examiner*—Louis Arana
*Attorney, Agent, or Firm*—Brigitte Jeffery; Keith G. W. Smith

[57] ABSTRACT

A logging-while-drilling tool contains a pulsed nuclear magnetic resonance (NMR) device for evaluating earth formations. An antenna of the pulsed NMR device is electromagnetically coupled with a drill collar of the tool for evaluating earth formations. In this way, the antenna generates a magnetic dipole parallel to a surface of the drill collar and the drill collar enhances the electromagnetic field generated by the antenna.

5 Claims, 9 Drawing Sheets

U.S. PATENT DOCUMENTS

| | | | |
|---|---|---|---|
| 4,875,013 | 10/1989 | Murakami et al. | 324/318 |
| 4,899,112 | 2/1990 | Clark et al. | 324/338 |
| 4,933,638 | 6/1990 | Kenyon et al. | 324/303 |
| 4,933,640 | 6/1990 | Kukes | 324/303 |
| 4,949,045 | 8/1990 | Clark et al. | 324/338 |
| 4,987,368 | 1/1991 | Vinegar | 324/303 |
| 5,023,551 | 6/1991 | Kleinberg et al. | 324/303 |
| 5,055,787 | 10/1991 | Kleinberg et al. | 324/303 |
| 5,055,788 | 10/1991 | Kleinberg et al. | 324/303 |
| 5,138,263 | 8/1992 | Towle | 324/338 |
| 5,200,699 | 4/1993 | Baldwin et al. | 324/303 |
| 5,235,285 | 8/1993 | Clark et al. | 324/342 |
| 5,280,243 | 1/1994 | Miller | 324/303 |
| 5,359,324 | 10/1994 | Clark et al. | 340/854.3 |
| 5,363,041 | 11/1994 | Sezginer | 324/303 |
| 5,376,884 | 12/1994 | Sezginer | 324/303 |
| 5,557,201 | 9/1996 | Kleinberg et al. | 324/303 |
| 5,629,623 | 5/1997 | Sezginer et al. | 324/303 |
| 5,757,186 | 5/1998 | Taicher et al. | 324/303 |
| 5,767,674 | 6/1998 | Griffin et al. | 324/303 |

PULSED NUCLEAR MAGNETISM TOOL FOR FORMATION EVALUATION WHILE DRILLING

CROSS-REFERENCE TO RELATED APPLICATIONS

The present application is a continuation-in-part of U.S. pat. app. Ser. No. 08/727,814, filed Oct. 8, 1996, which is a division of Ser. No. 08/338,317, filed Nov. 14, 1994, now U.S. Pat. No. 5,629,623 (Attorney Docket No. 60.1107/ 1221-CIP2); which is a continuation-in-part of Ser. No. 08/200,815, filed Feb. 22, 1994, now abandoned; which is a continuation of Ser. No 07/922,254, filed Jul. 30, 1992, now abandoned.

BACKGROUND OF THE INVENTION

The invention concerns a tool for logging while drilling. More specifically, the invention concerns a tool for logging a formation using pulsed nuclear magnetic resonance (NMR) techniques while drilling a borehole into the formation.

Several pulsed NMR tools have been designed for borehole deployment via wireline and are described in U.S. Pat. Nos. 4,350,955, issued September 1982 to Jackson et al.; 4,629,986, issued December 1986 to Clow et al.; 4,710,713, issued December 1987 to Strikman; 4,717,876, issued January 1988 to Masi et al.; 4,717,877, issued January 1988 to Taicher et al.; 4,717,878, issued January 1988 to Taicher et al.; 4,714,881, issued January 1987 to Givens; 5,023,551, issued June 1991 to Kleinberg et al.; 5,055,787, issued October 1991 to Kleinberg et al.; and 5,055,788, issued October 1991 to Kleinberg et al. All of these patents describe NMR tools which employ permanent magnets to polarize hydrogen nuclei, and RF antennas to excite and detect nuclear magnetic resonance to determine porosity, free fluid ratio, or permeability of a formation, for example. The tools described in U.S. Pat. Nos. 4,717,877; 5,055,787; and 5,055,788 have been successfully tested in boreholes.

Several logging while drilling (LWD) and measuring while drilling (MWD) tools have been designed for formation evaluation while drilling and drill string characterization while drilling, respectively. Logging or measuring instruments are placed in drill collars up to 100 ft behind the drill bit. An MWD tool is described in U.S. Pat. Nos. 3,777,560 to Guignard and 4,479,564 to Tanguy. An LWD tool is described in U.S. Pat. Nos. 4,899,112 to Clark et al. and 4,949,045 to Clark et al. Typically, these tools use electromagnetic techniques in evaluating resistivity of a formation while drilling.

U.S. Pat. No. 5,280,243 to Miller et al. describes a nuclear magnetic resonance (NMR) logging while drilling tool. According to this patent, the outer surface of a magnet is covered with an electrically insulative material. An RF antenna is mounted on the coated outer surface of the magnet. The RF antenna generates a magnetic dipole in a primary direction, perpendicular to the conductive drill collar surface, and the RF antenna generates an image magnetic dipole in the opposite direction, perpendicular to the drill collar surface. With the RF antenna electromagnetically isolated from the collar, the image magnetic dipoles in the opposite direction are smaller than the magnetic dipole in the primary direction, and a net RF magnetic dipole is generated for the NMR measurements. If electrically insulative coating is removed from the outer surface of the magnet, the magnetic dipole in the primary direction will have a magnitude substantially equal to the image magnetic dipole in the opposite direction. The magnetic dipole and the opposing image magnetic dipole will cancel each other, thus, disabling the NMR measurement.

SUMMARY OF THE INVENTION

The above disadvantages of the prior art are overcome by means of the subject invention. One aspect of the invention concerns an apparatus comprising a drilling means for drilling a borehole in an earth formation; and a measuring means, connected to the drilling means, for making nuclear magnetic resonance (NMR) measurements while the borehole is being drilled. A measuring means is connected to the drilling means, for making nuclear magnetic resonance (NMR) measurements while the borehole is being drilled. The measuring means comprises: a) means for producing a static magnetic field into the formation; b) means, electromagnetically coupled with the drilling means, for producing an oscillating magnetic field into the formation to excite nuclei of materials in the formation; and c) means for detecting resulting signals induced in the formation and determining a property of the formation in light of the detected signals. The drilling means includes a drill collar and the means for producing an oscillating magnetic field further generates a magnetic dipole moment parallel to a surface of the drill collar. The drill collar thereby enhances the output of the electromagnetic field.

BRIEF DESCRIPTION OF THE FIGURES

The advantages of the present invention will become apparent from the following description of the accompanying drawings. It is to be understood that the drawings are to be used for the purpose of illustration only, and not as a definition of the invention.

In the drawings.

DETAILED DESCRIPTION

Figure 1:
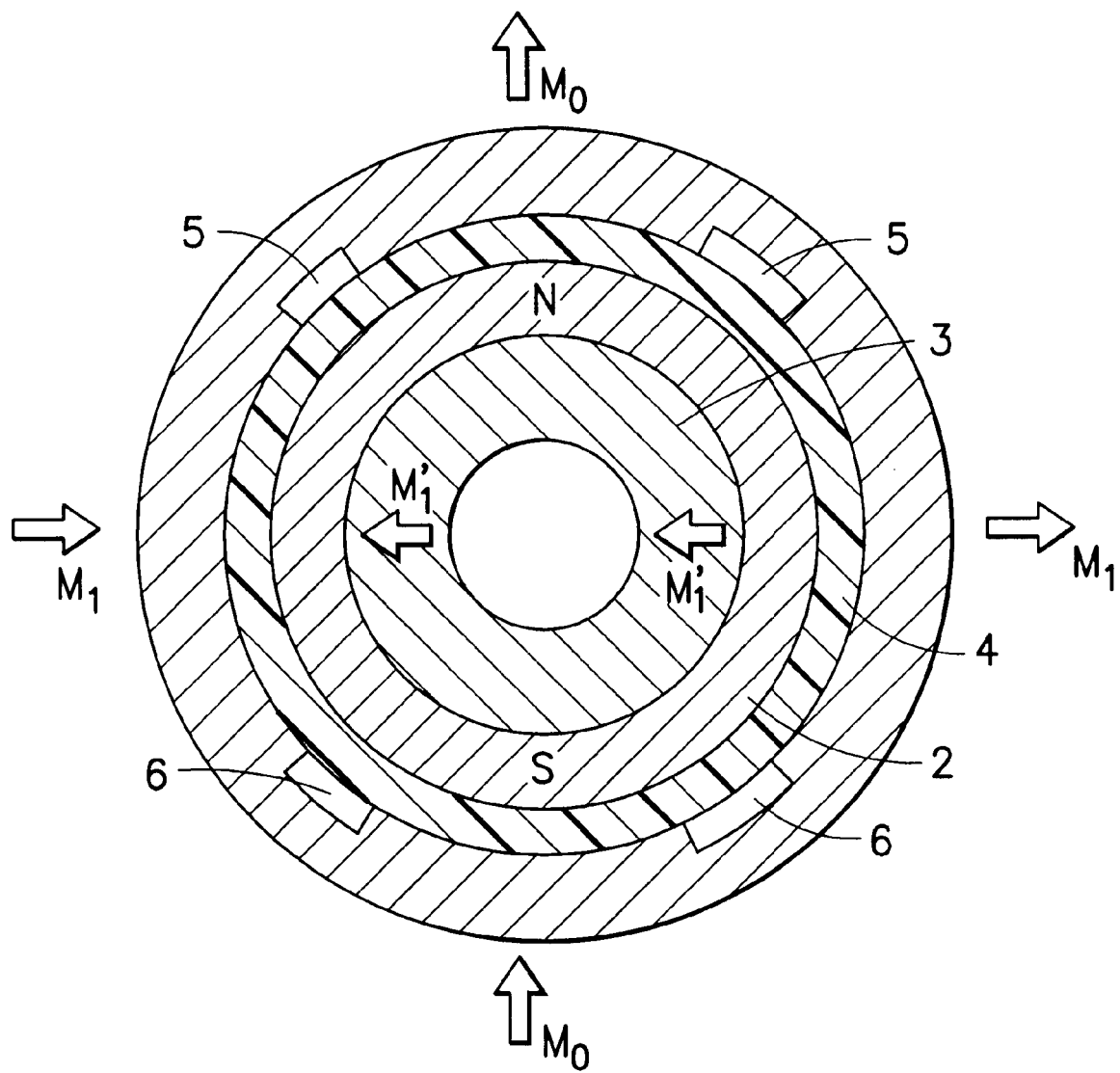
FIG. 1 illustrates a prior art logging-while-drilling tool.

FIG. 1 shows a prior art tool. A magnet 2 is mounted on the drill collar 3. The outer surface of the magnet is covered with an electrically insulative material 4. A pair of conductors 5, 6 are mounted on the insulative coating 4. The magnet 2 generates a static magnetic dipole, $M_0$, in the direction indicated by the corresponding arrow. The conductors 5, 6 generate an RF magnetic dipole, $M_1$, perpendicular to the static magnetic dipole, $M_0$, in the direction indicated by the corresponding arrow. Further, the conductors 5, 6 generate an opposing magnetic dipole image, $M_1$, in the direction indicated by the corresponding arrow. With the conductors 5, 6 electromagnetically isolated from the collar 3 by the insulative coating 4, the magnetic dipole image, $M_1$, is smaller than the RF magnetic dipole, $M_1$, and a net RF magnetic dipole is generated for the NMR measurements. If the insulative coating 4 is removed so that the coating 4 no longer separates the conductor 5, 6 and the drill collar 3, the RF magnetic dipole, $M_1$, will cancel the magnetic dipole image, $M_1$, thus disabling the NMR measurement.

Figure 2:
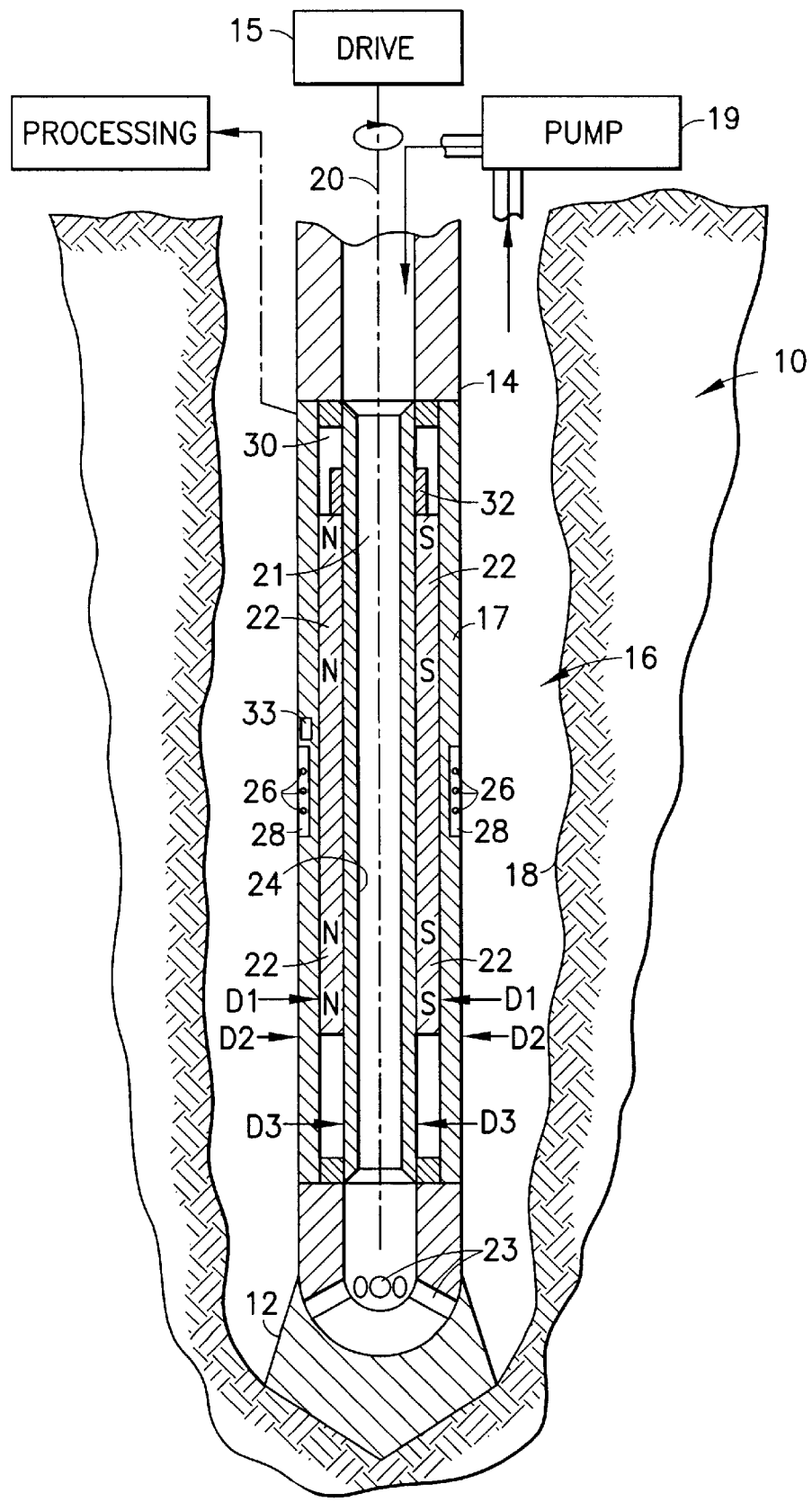
FIG. 2 shows a cross section of a tool for pulsed NMR formation evaluation while drilling.

FIG. 2 shows a tool 10 according to this invention. The tool 10 includes a drill bit 12, drill string 14, and pulsed NMR device 16 (housed within a drill collar 17). The drill bit 12 and drill string 14 comprise a means for drilling a borehole 18 in an earth formation. The drill collar 17 is a strong shaft that bears the torque, bending moment, and axial force on the drill string. Drill collar 17 is also the external member that is in contact with the drilling fluid and rock cuttings in the well bore, and the earth formation in which the well is drilled. As is known in the art, a drive mechanism 15 rotates the drill string 14 and drill bit 12. See U.S. Pat. No. 4,949,045 to Clark et al. The drill collar 17 is made of a nonmagnetic alloy. The tool 10 also comprises a means for making pulsed nuclear magnetic resonance (NMR) measurements while a borehole 18 is being drilled. The pulsed NMR device 16 is connected as part of the drill string 14 and is housed within the drill string 14.

The borehole 18 typically contains fluids, such as drilling mud, which are pumped from pump 19 into the borehole 18 and carry formation cuttings back to the surface. Such a pump is described in U.S. Pat. No. 4,949,045 to Clark et al. A channel 21 within the drill string 14 comprises a means for carrying the borehole fluid through the drill string 14. The channel 21 is cut within the drill collar 17 substantially parallel to the longitudinal axis 20. The channel 21 opens to the borehole 18 through ports 23 in the drill bit 12.

The pulsed NMR device 16 comprises a magnet 22 and an RF antenna 26. The sleeve shaped, tubular magnet 22 is permanently magnetized transversely to the axis of the tool. The magnet 22 is located inside the drill collar 17 and outside a mud sleeve 24. Its length is approximately 2–6 ft. The magnet 22 can be installed into a recess that is cut out either from the outside or from the inside of the drill collar 17. Preferably, the recess is cut from the inside. Because the bending and torsional strengths of the drill collar 17 are proportional to the difference of the fourth powers of the drill collar's outer and inner radii, a recess cut from the inside of the drill collar 17 provides greater mechanical strength and further provides sufficient space to accommodate the magnet 22 and mud sleeve 24. For example, in FIG. 1, the inner D1 and outer D2 diameters of the drill collar 17 at the magnet recess are 5.000" and 6.750", respectively. The inner D3 and outer D1 diameters of the magnet 22 are 3.000" and 5.000", respectively. These dimensional values, and those below, are only cited as examples. Numerous other values of the diameter, thickness, and depth are possible.

Still referring to FIG. 2, an RF antenna 26 is electromagnetically coupled with the drill collar 17. The antenna 26 may be located either on the outside or inside of the drill collar 17. Preferably, the antenna 26 is located in the antenna recess 28 on the outside of the drill collar 17, because at the frequency of operation (0.1–2 MHz), the resulting RF magnetic field may not diffuse out through the drill collar 17.

The pulsed NMR portion 16 of this tool 10 includes electronic circuitry. The drill collar 17 includes a compartment 30 preferably at atmospheric-pressure, which contains circuitry 32. Compartment 30 can be located either in an annulus between the drill collar 17 and the mud sleeve 24 as shown in FIG. 2, or it can be located in a sub in the mud channel 21. The drill collar 17 also includes a small compartment 33, preferably at atmospheric pressure, which contains means of connecting the antenna 26 to the electronics 32. The compartment 33 can also contain electronic components, such as tuning capacitors, Q-switch, duplexer, and preamplifier, which are preferably placed close to the RF antenna. Driving circuitry 32 and electronic components contained in compartment 33 are described in U.S. Pat. Nos. 5,055,787 and 5,055,788 to Kleinberg et al.

The NMR device 16 is pulsed and the formation is logged according to the technique described in U.S. Pat. Nos. 5,055,787; 5,055,788; and 5,023,551 to Kleinberg et al, U.S. Pat. No. 5,363,041 to Sezginer, and co-pending application Ser. No. 800,339. The information representing the evaluation of the formation is stored in a downhole memory (not shown) and is obtained from the pulsed NMR device 16 in a manner as described in U.S. Pat. No. 4,949,045 to Clark et al.

Figure 3:
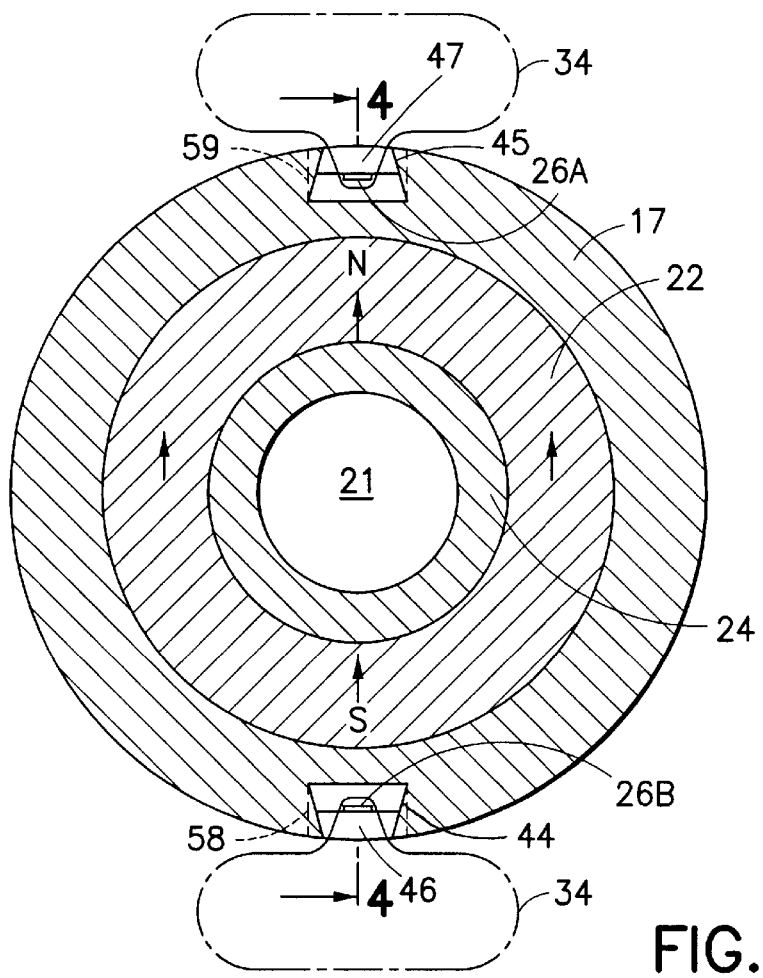
FIGS. 3–4 show an embodiment of the invention.
Figure 4:
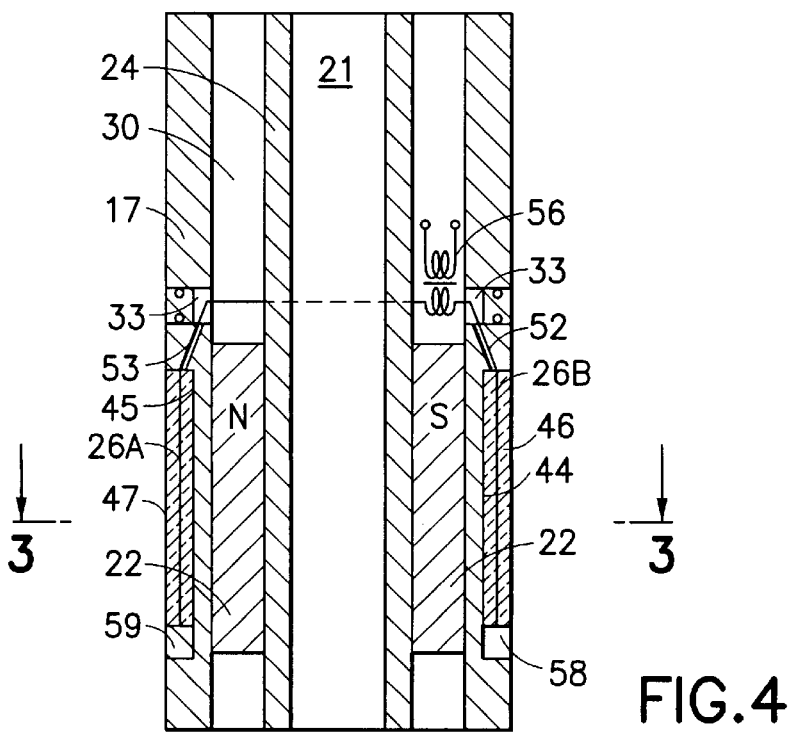
Figure 5:
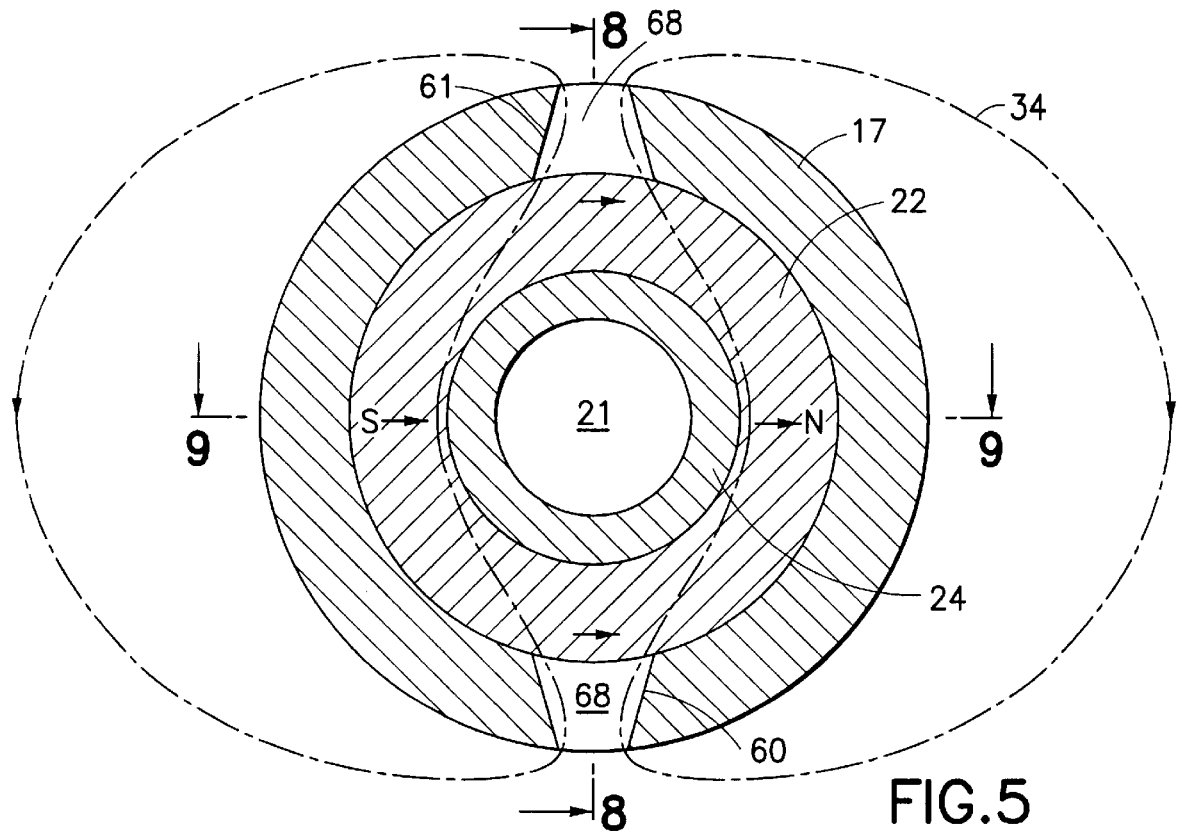
FIGS. 5–10 show a second embodiment of the invention.
Figure 6:
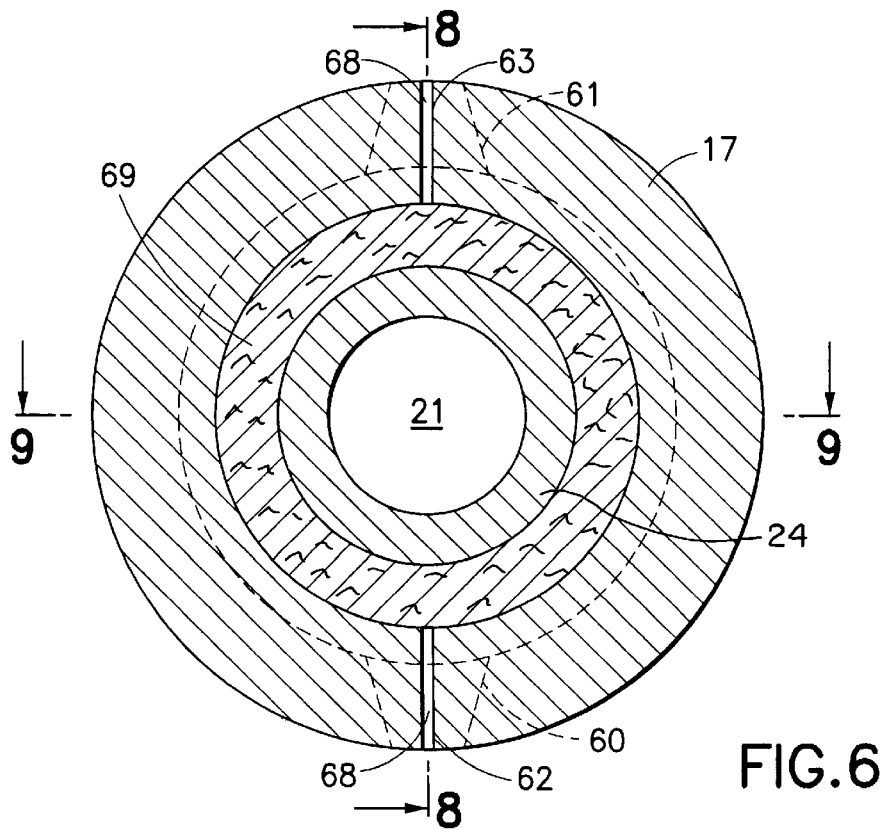
Figure 7:
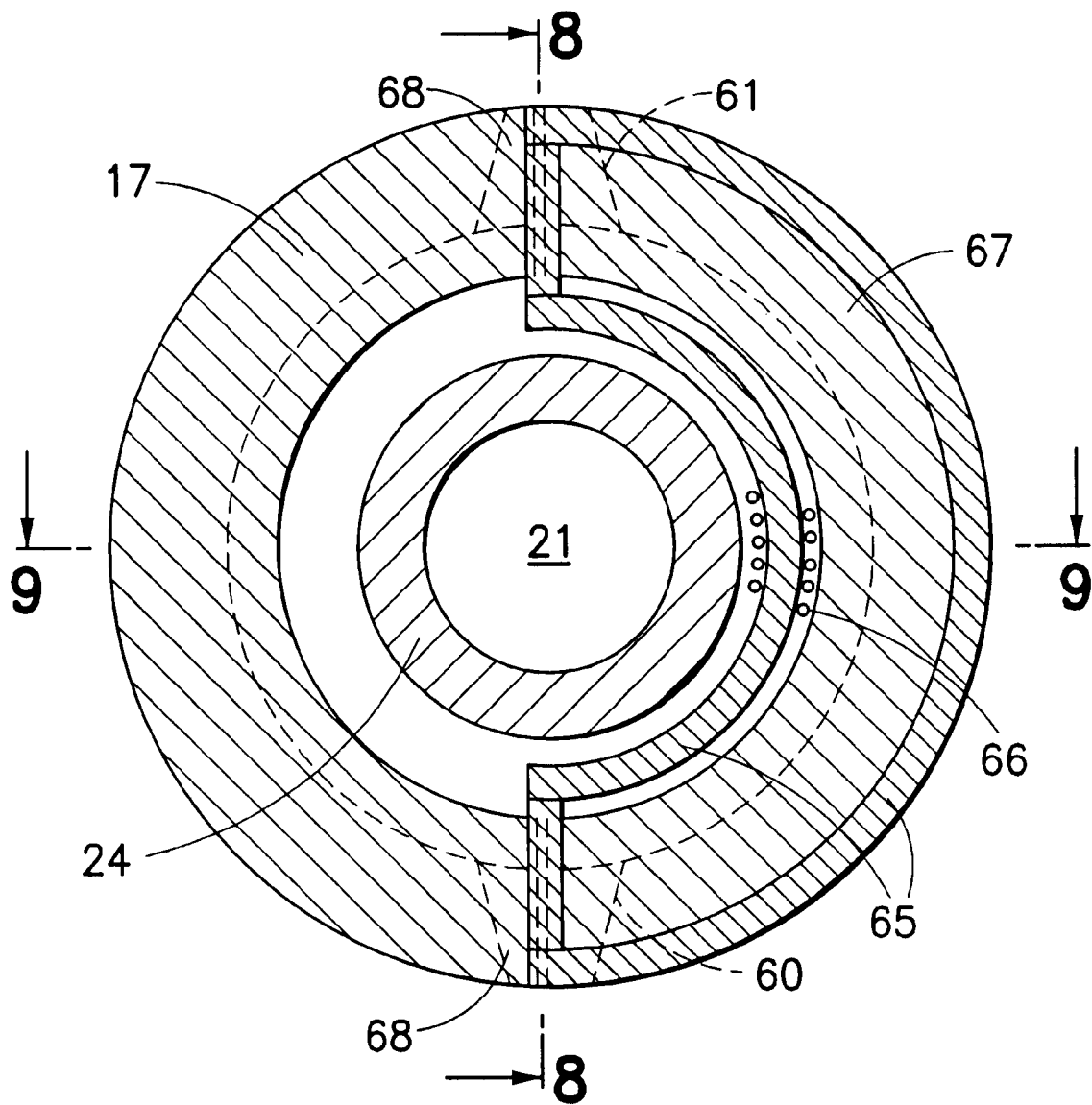
Figure 9:
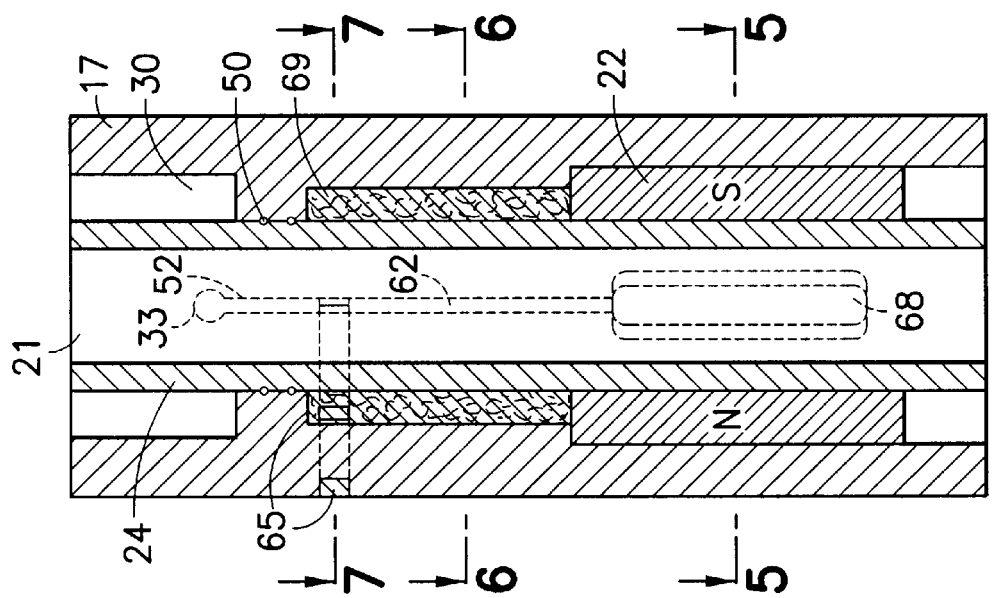
Figure 8:
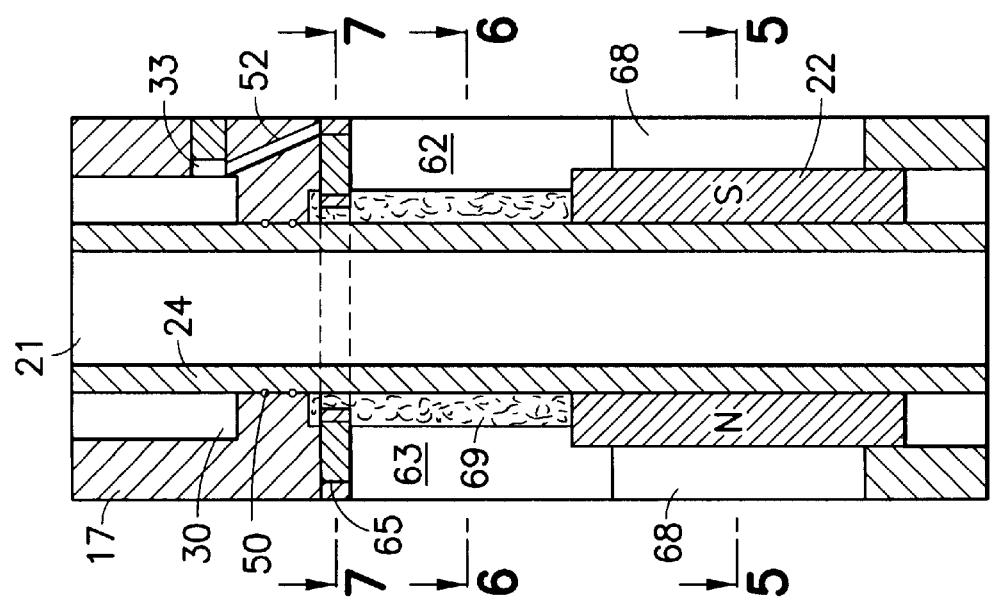
Figure 10:
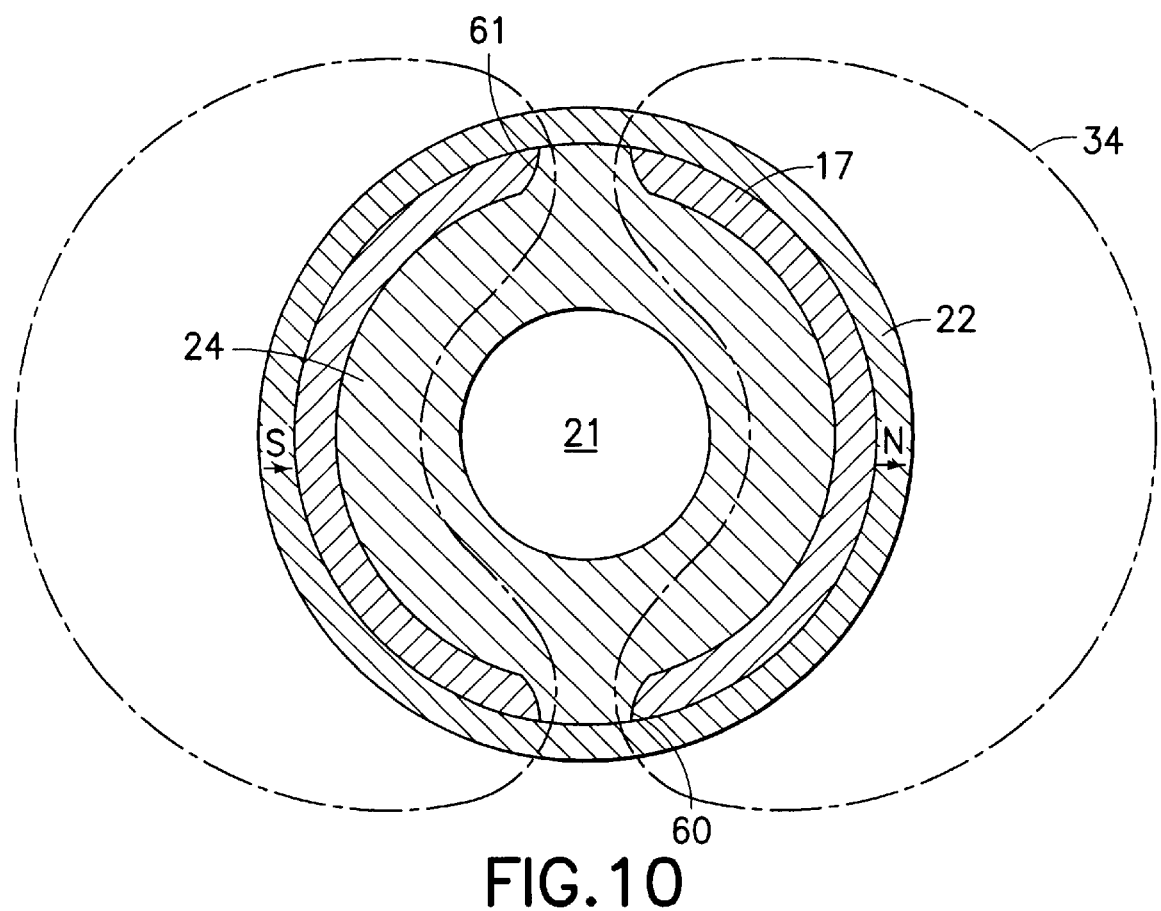

Referring to FIG. 3 and FIG. 4, the drill collar 17, electromagnetically coupled with the antenna 26, entirely encloses the magnet 22. The magnet 22 does not interfere with the RF field 34 produced by antenna 26. Therefore, the magnet 22 can be either ceramic or metallic. Since magnets made of metallic materials such as Sm—Co or Nd—Fe—B are 2.5 times stronger than ceramic magnets, they can be made thinner in the radial dimension, thus simplifying the mechanical design. Conductors 26A, 26B in axial grooves 44, 45 cut into the outside surface of the drill collar 17 comprise the RF coil. The RF conductors 26A, 26B and their grooves 44, 45 are shorter than the magnet 22 so that the conductors 26A, 26B have negligible sensitivity to the spins in the fringing field of the magnet 22 where the resonant region intersects the borehole. The RF conductors 26A, 26B are protected from the drilling environment by nonconductive, nonmagnetic segmented covers 46,47. Ceramic is a suitable material for covers 46, 47.

The conductors 26A, 26B are electrically grounded to the drill collar 17 at one end. At the other end, the conductors 26A, 26B are connected to an RF transformer 56 via pressure feed-through 52, 53. The transformer 56 keeps a 180° phase difference between the currents in diametrically opposite RF conductors. If the transformer 56 has a magnetic core, the transformer 56 must be located sufficiently far away from the magnet 22 so that the core of the transformer 56 is not magnetically saturated and so that the transformer 56 does not perturb the field of the magnet. Alternatively, the transformer 56 can be implemented using active circuits without any magnetic components.

The segmented covers 46, 47 are slid into corresponding dove-tail shaped grooves 44, 45 from the pits 58, 59. Pits 58, 59 are then covered by metallic inserts bolted into place. The RF antenna 26, exposed to the borehole pressure, can be impregnated by a rubber compound to seal out the borehole fluid. The magnet 22 and transformer 56 are at atmospheric pressure.

FIGS. 5–10 illustrate another embodiment of the invention. According to this embodiment, the drill collar itself produces the oscillating magnetic field. The RF field 34 is produced outside the drill collar 17 by making the drill collar 17 into an antenna comprising a single-turn coil or loop. This is accomplished by cutting axially oriented slots 60, 62, 61 and 63 through the entire thickness of the drill collar 17 as shown in FIGS. 5–8. The loop formed by the drill collar 17 cannot be broken to make electrical contacts to the drill collar because this would diminish the strength of the drill collar 17. Therefore, a toroidal magnetic core 65 (See FIG. 7) driven by a primary winding 66 is wrapped around one leg 67 of the split drill collar 17 to induce an RF current in the antenna formed by the drill collar 17.

Effectively, this arrangement is a voltage transformer where the magnetic core 65 is the core, a portion of the drill collar 17 is the secondary winding, and 66 is the primary winding. The transformer is a means for inducing an RF current circumferentially around the drill collar which in turn generates a magnetic dipole parallel to the surface of the drill collar. An example of such transformer technology is described in U.S. Pat. No. 5,235,285 to Clark et al. The Clark patent describes a toroidal coil having leads for sensing current flow. The leads of the coil pass through a bulkhead feed-through to circuitry. One lead or conductor is coupled to an amplifier and the other lead or conductor is coupled to a drill collar. See FIGS. 3, 5, and 6 of the Clark patent, for example.

Still referring to FIGS. 5–10, the slots 62, 63 are narrower than the slots 60, 61 to keep the RF field low in the fringing field of the magnet 22. Slots 60–63 can be filled by ceramic insulating blocks 68. The magnet and all components of the RF winding 66 (including the slotted drill collar 17) are exposed to the borehole pressure. The RF winding 66 is connected to the RF electronics via a pressure feed-through 52. Since the RF field has to go through the magnet 22 in this embodiment, the magnet 22 must be made of a nonconductive material such as ceramic.

Figure 11:
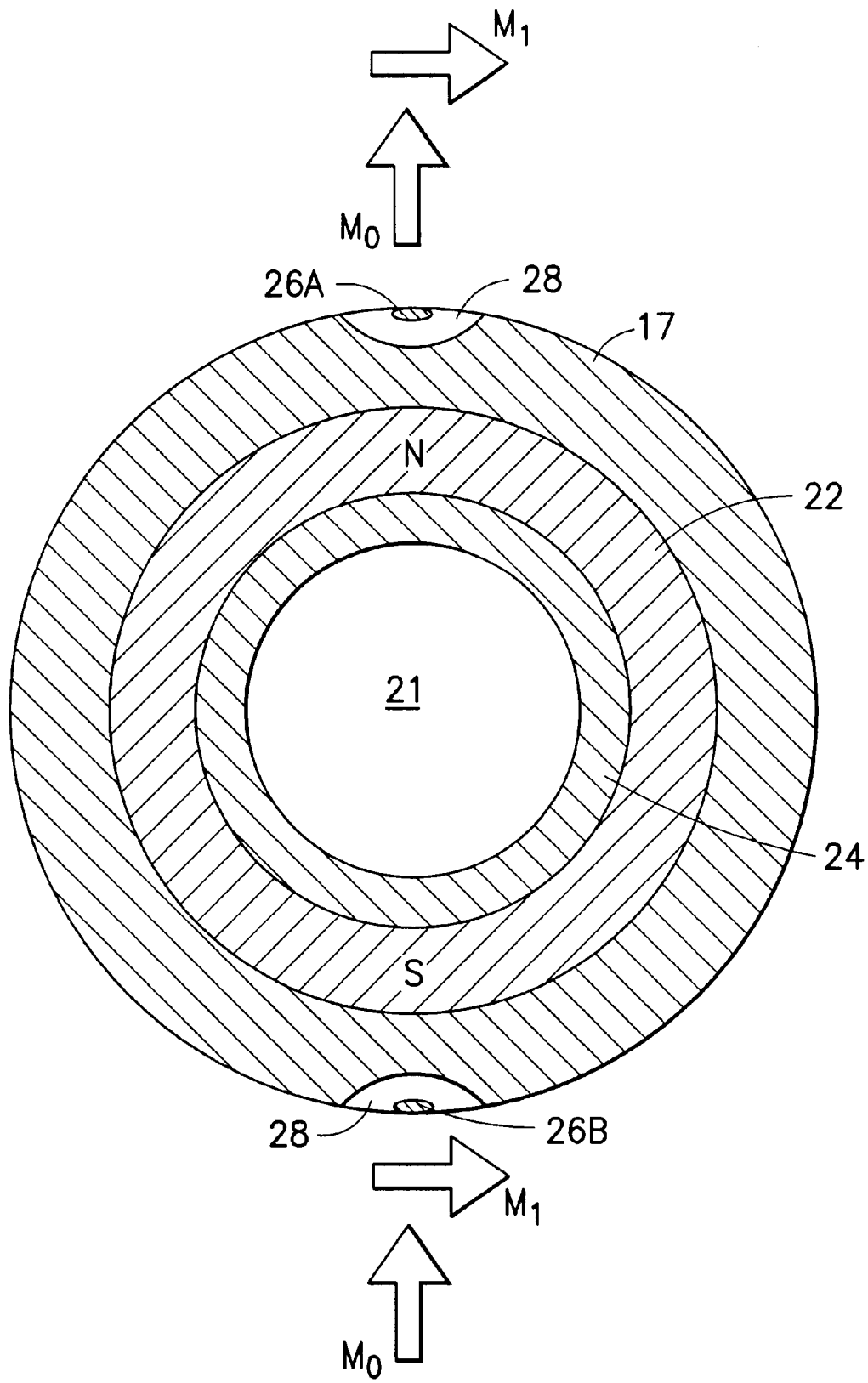
FIG. 11 shows a third embodiment of the invention.

FIG. 11 illustrates another embodiment of the invention. The magnet 22 generates a static magnetic dipole, $M_0$, in the direction indicated by the corresponding arrow. The drill collar 17 in combination with conductors 26A, 26B produce an RF magnetic dipole, $M_1$, perpendicular to the static magnetic dipole. In this embodiment, the drill collar 17 is part of the antenna, in combination with conductors 26A, 26B. Current flows through conductors 26A, 26B and the current loops are completed by the drill collar 17. These current loops generate a magnetic dipole on the surface of the drill collar in the azimuthal direction. The recess 28 may be filled with ferrite to improve the efficiency of the RF antenna formed by the conductors 26A, 26B and collar 17.

Figure 12:
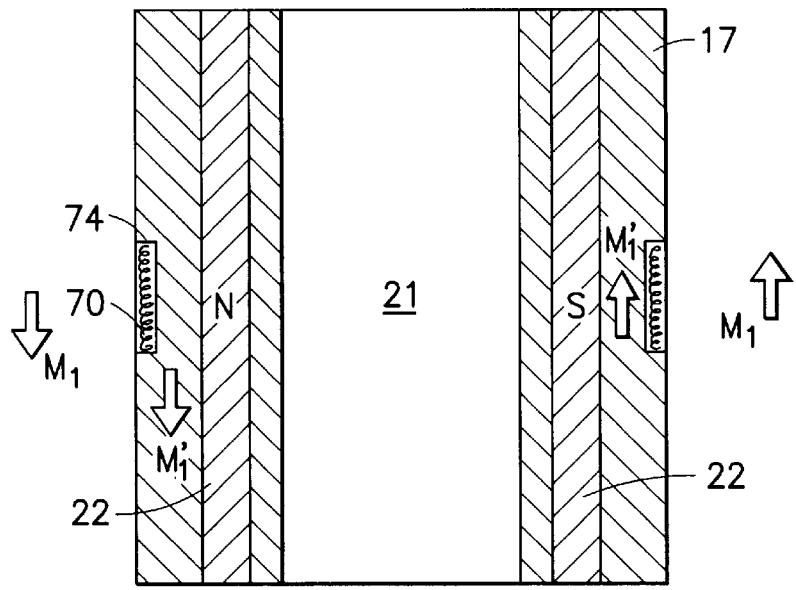
FIGS. 12–13 show a fourth embodiment of the invention.
Figure 13:
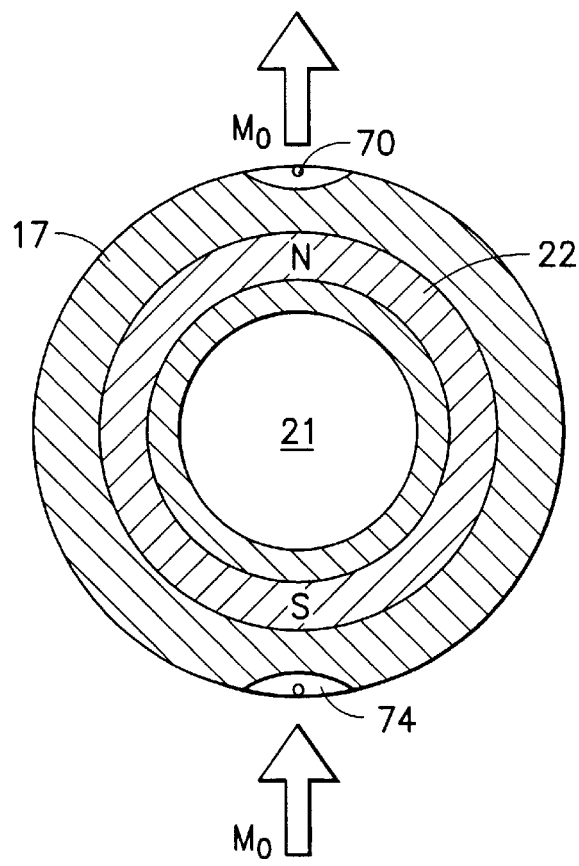

FIG. 12 and FIG. 13 illustrate another embodiment of the invention. The drill collar 17, electromagnetically coupled with a magnetic current element 70, entirely encloses the magnet 22 and creates a conducting plane in the logging-while-drilling tool 10. The magnetic current element 70 is located in recess 74. The magnetic current element 70 may be formed by a solenoid or a similar device consisting of coil windings. As the electric current flows through element 70, it generates a magnetic dipole, $M_1$, in a direction parallel to the outside surface of the drill collar 17. A magnetic dipole image, $M_1$, is created, in the same direction, parallel to the opposite side of the drill collar surface. In effect, the conductive drill collar 17 enhances the electromagnetic field on the outside surface of the drill collar 17 generated by the magnetic current element 70.

The foregoing description of the preferred and alternate embodiments of the present invention have been presented for purposes of illustration and description. It is not intended to be exhaustive or limit the invention to the precise form disclosed. Obviously, many modifications and variations will be apparent to those skilled in the art. The embodiments were chosen and described in order to best explain the principles of the invention and its practical application thereby enabling others skilled in the art to understand the invention for various embodiments and with various modifications as are suited to the particular use contemplated. It is intended that the scope of the invention be defined by the accompanying claims and their equivalents.

We claim:

1. An apparatus comprising:

a drilling means, including a drill collar, for drilling an earth formation; and, a measuring means, connected to the drilling means, for making nuclear magnetic resonance (NMR) measurements while the borehole is being drilled, the measuring means comprising:

a) means for producing a static magnetic field into the formation;

b) means, electromagnetically coupled with the drilling means, for producing an oscillating magnetic field and a magnetic dipole parallel to a surface of the drill collar into the formation to excite nuclei of materials in the formation; and, c) means for detecting resulting signals induced in the formation and determining a property of the formation in light of the detected signals.

2. The apparatus of claim 1, wherein the means for producing an oscillating magnetic field are located inside the drill collar.

3. The apparatus of claim 1, wherein the means for producing an oscillating magnetic field are located outside the drill collar.

4. The apparatus of claim 1, wherein the means for producing the oscillating magnetic field comprise a drill collar and a plurality of conductors.

5. A method comprising:

a) providing a drilling device;

b) drilling a borehole in an earth formation with the drilling device;

c) making nuclear magnetic resonance (NMR) measurements with the drilling device while the borehole is being drilled;

d) producing, from the drilling device, a static magnetic field into the formation;

e) producing, from the drilling device, an oscillating magnetic field into the formation to excite nuclei of materials in the formation;

f) generating, from the drilling device, a magnetic dipole moment parallel to a surface of the drilling device; and g) detecting resulting signals induced in the formation and determining a property of the formation in light of the detected signals.

* * * * *